(12) United States Patent
Nies et al.

(10) Patent No.: US 8,396,732 B1
(45) Date of Patent: Mar. 12, 2013

(54) SYSTEM AND METHOD FOR INTEGRATED WORKFORCE AND ANALYTICS

(75) Inventors: James Gordon Nies, Carmel, IN (US); Simon Shvarts, Cupertino, CA (US); Joseph Watson, Alpharetta, GA (US)

(73) Assignee: Verint Americas Inc., Melville, NY (US)

( * ) Notice: Subject to any disclaimer, the term of this patent is extended or adjusted under 35 U.S.C. 154(b) by 1530 days.

(21) Appl. No.: 11/743,300

(22) Filed: May 2, 2007

Related U.S. Application Data

(60) Provisional application No. 60/798,683, filed on May 8, 2006.

(51) Int. Cl.
*G06Q 30/00* (2006.01)

(52) U.S. Cl. .......... 705/7.12; 705/7.22; 705/7.25; 705/7.28

(58) Field of Classification Search .......... 717/174; 705/7.11, 7.12, 7.13, 7.22, 7.25, 7.26, 7.27, 705/8

See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |

(Continued)

FOREIGN PATENT DOCUMENTS

| | | |
|---|---|---|
| EP | 0453128 A2 | 10/1991 |
| EP | 0773687 A2 | 5/1997 |

(Continued)

OTHER PUBLICATIONS

"Customer Spotlight: Navistar International," Web page, unverified print date of Apr. 1, 2002.

(Continued)

*Primary Examiner* — Thomas Dixon
*Assistant Examiner* — Gerald Vizvary

(57) ABSTRACT

Systems and methods of integrating workforce management and contacts analysis are disclosed. An exemplary method comprises receiving content data derived from classification of a plurality of recorded agent contacts. The contact content data is correlated with past time period. The method also comprises identifying at least one pattern in the contact content data. The pattern is based on the contact classifications. The method also comprises receiving historical workload data from a contact router, and generating a workload forecast based on the historical workload data and the identified pattern.

18 Claims, 10 Drawing Sheets

U.S. PATENT DOCUMENTS

| | | |
|---|---|---|
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,289,382 B1 * | 9/2001 | Bowman-Amuah .......... 709/226 |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,606,744 B1 * | 8/2003 | Mikurak ....................... 717/174 |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,728,695 B1 * | 4/2004 | Pathria et al. ......................... 1/1 |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,904,449 B1 * | 6/2005 | Quinones ..................... 709/203 |
| 6,959,078 B1 | 10/2005 | Eilbacher et al. |
| 6,965,886 B2 | 11/2005 | Govrin et al. |
| 7,023,979 B1 * | 4/2006 | Wu et al. ................. 379/265.11 |
| 7,043,008 B1 * | 5/2006 | Dewan .................... 379/265.06 |
| 7,085,728 B2 * | 8/2006 | Sarlay et al. ................. 705/7.13 |
| 7,203,285 B2 * | 4/2007 | Blair .......................... 379/32.01 |
| 7,222,075 B2 * | 5/2007 | Petrushin ...................... 704/270 |
| 8,078,486 B1 * | 12/2011 | Mclean et al. ............... 705/7.14 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0152305 A1 * | 10/2002 | Jackson et al. ................ 709/224 |
| 2002/0165954 A1 | 11/2002 | Eshghi et al. |
| 2002/0184069 A1 * | 12/2002 | Kosiba et al. ...................... 705/8 |
| 2003/0014491 A1 * | 1/2003 | Horvitz et al. ................ 709/206 |
| 2003/0055883 A1 * | 3/2003 | Wiles, Jr. ..................... 709/203 |
| 2003/0079020 A1 | 4/2003 | Gourraud et al. |
| 2003/0144900 A1 * | 7/2003 | Whitmer ......................... 705/11 |
| 2003/0154240 A1 | 8/2003 | Nygren et al. |
| 2003/0163360 A1 * | 8/2003 | Galvin ............................... 705/8 |
| 2004/0100507 A1 | 5/2004 | Hayner et al. |
| 2004/0165717 A1 | 8/2004 | McIlwaine et al. |
| 2005/0043986 A1 * | 2/2005 | McConnell et al. ............. 705/11 |
| 2005/0138560 A1 | 6/2005 | Lee et al. |
| 2007/0195944 A1 * | 8/2007 | Korenblit et al. ......... 379/265.06 |
| 2007/0198323 A1 * | 8/2007 | Bourne et al. .................. 705/10 |
| 2008/0002823 A1 * | 1/2008 | Fama et al. .............. 379/265.12 |
| 2008/0004933 A1 * | 1/2008 | Gillespie .......................... 705/9 |

FOREIGN PATENT DOCUMENTS

| | | |
|---|---|---|
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unverified print date of Apr. 1, 2002, unverified cover date of Jun. 15, 1999.

"OnTrack Online Delivers New Web Functionality," Web page, unverified print date of Apr. 2, 2002, unverified cover date of Oct. 5, 1999.

"PriceWaterouseCoopers Case Study The Business Challenge," Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 152, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Coursewae through Adaptive Linking,"*ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 (© 2001).

Cybulski and Linden, "Teaching Systems Analysis and Design Using Multimedia and Patterns," unknown date, unknown source.

De Bra et al., "Adaptive Hypermedia: From Systems to Framework,"*ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web,"*Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support,"*Technical Skills and Training* pp. 25-27 (May/Jun. 1997).

Linton, et al. "Owl: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Leaning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs,"* *Communications ACM* 38(7):27-39 (Jul. 1995).

O'Herron, "CenterForce Technologies CenterForce Analyzer," Web page unverified print dateof Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: Univerity of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom,"*InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents,"*Technical Training* pp. 12-15 (Oct. 1997).
Witness Systems promotional brochure for eQuality entitled "Bringing eQuality to Bisiness".
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on You Agents," Call Center Magazine, pp. 32-34, Feb. 1993 LPRs & 798.

Anderson: Interactive TVs New Approach, The Standard, Oct. 1, 1999.
Ante, *Everything You Ever Wanted to Know About Cryptography Legislation... (But Were to Sensible to Ask)*, PC world Online, Dec. 14, 1999.
Berst, *It's Baa-sack. How Interative TV is Sneaking Into Your Living Room*, The AnchorDesk, May 10, 1999.
Berst, *Why Interactive TV Won't Turn You on (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjàvu—*Will Interactive TV Make It This Time Around?*, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle, *Will the Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Mendoza, *Order Pizza WhileYou Watch*, ABCNews.com.
Moody, *WebTV: What the Big Deal?*, ABCNews.com.
Murdorf, et al., *Interactive Television—Is There Life After the Internet?*, Interactive TV News.
Needle, *PC, TV or Both?*, PC World Online.
*Interview with Steve Perlman*, CEO of Web-TV Networks, PC World Online.
Press, *Two Cultures, The Internet and Interactive TV*, Universite de Montreal.
Reuters, *Will TV Take Over Your PC?*, PC World Online.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online.
Stewart, *Interactive Television at Home: Television Meets the Internet*, Aug. 1998.
Swedlow, *Computer TV Shows: Ready for Prime Time?*, PC World Online.
Wilson, *U.S. West Revisits Interactive TV*, Interactive Week, Nov. 28, 1999.

\* cited by examiner

SYSTEM AND METHOD FOR INTEGRATED WORKFORCE AND ANALYTICS

CROSS REFERENCE TO RELATED APPLICATIONS

This application claims the benefit of U.S. Provisional Application No. 60/798,683, filed May 8, 2006 and hereby incorporated by reference herein.

FIELD OF THE DISCLOSURE

The present disclosure relates to call centers.

BACKGROUND

The business of a contact center is to provide rapid and efficient interaction between agents and customers (or prospective customers). Existing solutions require the purchase of multiple hardware and software components, typically from different vendors, to achieve the business goals of the contact center. The use of separate systems of components leads to a variety of problems. For instance, each system typically has its own method of configuration and its own user interface. Thus, exchanging data between the systems requires additional work by someone at the contact center.

Furthermore, contact centers are continually tasked with striking a balance between service quality, efficiency, effectiveness, revenue generation, cost cutting, and profitability. As a result, today's contact center agents are charged with mastering multiple data sources and systems, delivering consistent service across customer touch points, up-selling, cross-selling, and saving at-risk customers, while winning new ones.

The systems and methods described herein provide integrated solutions for performing workforce management and analysis of recorded interactions. Combining these two functionalities as a unified integrated solution, delivered through a single platform, enables users to gain more insight and make smarter decisions faster about sales, service, and overall operations. This takes contact center tools beyond the traditional "suite" approach to a true single workforce optimization platform.

As can be seen, while each technology segment delivers value, integration is the key: together the segments deliver greater impact than the sum of their individual parts. Utilizing them separately limits the contact center's potential to become a strategic business asset.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

SUMMARY OF THE INVENTION

Systems and methods of integrating workforce management and contacts analysis are disclosed. An exemplary method comprises receiving content data derived from classification of a plurality of recorded agent contacts. The contact content data is correlated with past time period. The method also comprises identifying at least one pattern in the contact content data. The pattern is based on the contact classifications. The method also comprises receiving historical workload data from a contact router, and generating a workload forecast based on the historical workload data and the identified pattern.

Another exemplary method comprises monitoring a stream of application events from an application monitor. Each event associated with agent workstation activity. The method also comprises determining a count of agent work units represented by the application event stream. The method also comprises receiving historical workload data from a contact router, and generating a workload forecast based on the historical workload data and the count of agent work units.

Another exemplary method comprises capturing a plurality of contacts made by an agent. The method also comprises analyzing at least a portion of the contacts to derive contact description information. The method also comprises displaying a timeline. The method also comprises displaying, in visual correlation with the timeline, a plurality of activities performed by the agent. At least a portion of the activities are associated with one of the captured contacts. The method also comprises displaying, for those activities associated with one of the captured contacts, the contact attribute. The contact attribute is displayed in visual proximity to the activity.

DETAILED DESCRIPTION

Figure 1:
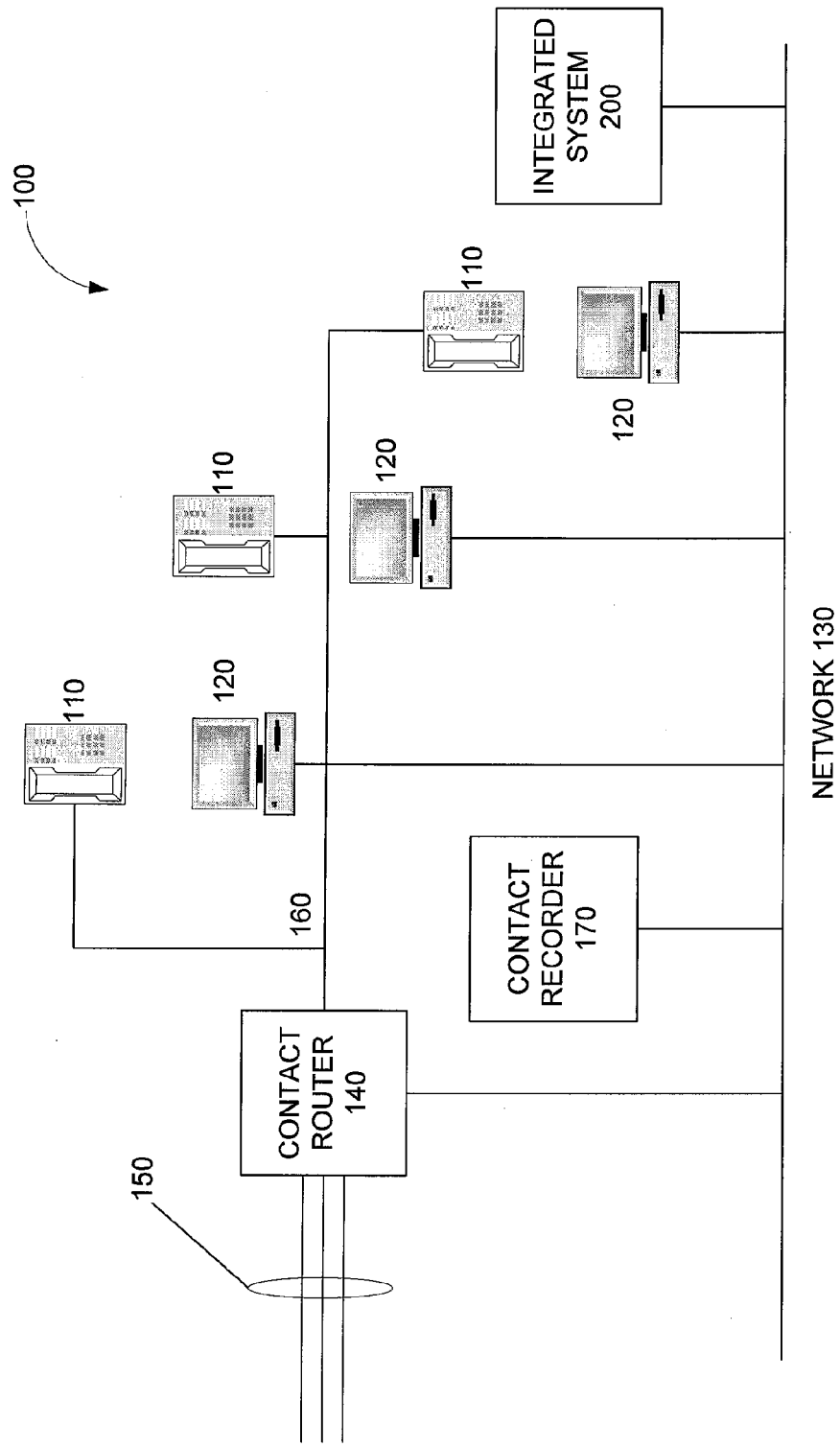
FIG. 1 is a block diagram of a contact center environment.

FIG. 1 is a block diagram of a contact center environment 100. The contact center 100 is staffed by agents who handle incoming and/or outgoing contacts. Although the traditional and most common form of contact is by phone, other types of contacts are becoming more common (e.g., text chat, web collaboration, email, and fax). An agent workspace includes an agent phone 110 and a workstation computer 120. A network 130 connects one or more of the workstations 120.

A contact router 140 distributes incoming contacts to available agents. When the contacts are made by traditional phone lines, the contact router 140 operates by connecting outside trunk lines 150 to agent trunk lines 160. In this environment, the contact router 140 may be implemented by an automatic call distributor (ACD), which queues calls until a suitable agent is available. Other types of contacts, such as Voice over Internet Protocol (VoIP) calls and computer-based contacts (e.g., chat, email) are routed over one or more data networks. These contacts are distributed over network 130 to one of the agent workstations 120.

During a customer contact, the agent interacts with one or more applications running on the workstation 120. Example workstation applications give the agent access to customer records, product information, ordering status, and transaction history, for example. The applications may access one or more business databases (not shown) via the network 130.

A contact recorder 170 provides the ability to capture or record contacts of many different types, including traditional and IP telephony environments, text chat, web collaboration, email, and fax. A recorded contact may consist of multiple streams of data. One stream may be considered a "content" stream: on a voice call, the content stream is a digitized voice stream; on a text chat contact, the content stream is text.

While on a call with a customer, the agent interacts with one or more applications 180 running on the workstation 120. Examples are applications that give the agent access to customer records, product information, ordering status, transaction history, etc. The applications may access one or more enterprise databases (not shown) via the network 130.

The contact center 100 also includes a computer-implemented integrated contact center system 200, described in further detail in connection with FIG. 2.

Figure 2:
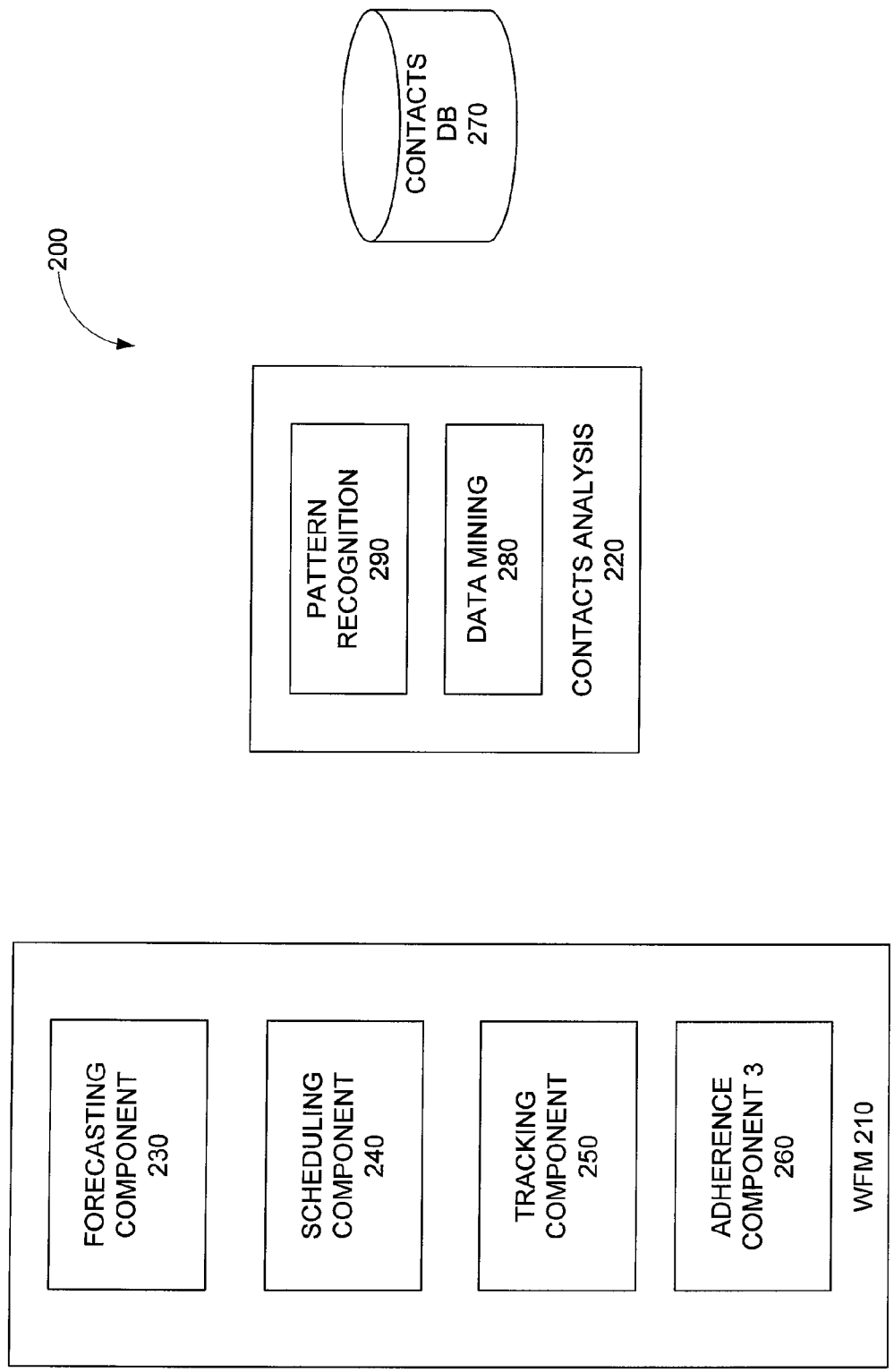
FIG. 2 is a high-level view of components in one embodiment of an integrated contact center system.

FIG. 2 is a high-level view of components in one embodiment of an integrated contact center system 200. The integrated system 200 includes at least a work force manager (WFM) component 210 and a contacts analysis component 220. An integrated contact center system such as system 200 allows contact center analysts to quickly access the right information. Such an integrated system allows valuable and previously undiscovered information to be uncovered. This new level of visibility into contact center operations should allow personnel make better decisions faster.

The WFM 210 performs many functions related to the agent workforce. The functionality of the entire WFM 210 is typically divided among several applications, executables, processes, or services. A forecast component (230) predicts future workload based on past workload, where workload includes contact volume and handle time for intervals throughout a historical period. A scheduler component (240) calculates staffing levels and agent schedules based on predicted workload. A tracking component (250) provides a contact center supervisor or manager with information about agent activities and agent-customer interactions, both historical and real-time. An adherence component (260) supplies the supervisor with information on how well each agent complies with contact center policies.

Contacts database 270 stores contacts recorded by contact recorder 170. The database may include descriptive information as well as recorded content. Contact center supervisors and quality analysts can tap into these recorded interactions to review, evaluate, and score agent performance.

Contacts analysis component 220 consists of a mining function 280 and a pattern recognition function 290. The mining function 280 mines the streams of unstructured data within a recorded interaction to produce structured data. Structured data includes any data format that is understood and easily accessible from an application, for example, a database schema, software data structures, etc. Pattern recognition function 290 correlates instances of structured data with other instances of structured data to extract additional meaning from the interactions. The structured data used by pattern recognition function 290 includes data produced by the mining function 280, as well as other forms of structured data provided as input to contacts analysis component 220.

Examples of analysis include categorizing calls based on content, analyzing a call against an expected call pattern and reporting exceptions to the pattern, and providing a visualization layer for recorded interactions that displays other data attributes such as agent activities coincident with call events.

In one embodiment, integrated system 200 also includes one or more of a performance manager, an evaluation manager, and a development manager. The evaluation manager allows various types of employee performance review processes to be managed (i.e., 360 degree reviews). The performance manager receives data from the evaluation manager and presents the performance data to the contact center manager through various scorecard view. The development manager tracks employee Learning/Development and detects a need for training.

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more of various functions such as receiving, capturing, intercepting, and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence, and compliance purposes, for example. Such integrated functionality can improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities.

Referring back to the collections example outlined above, by using emotion and concept detection, companies can identify which customers are attempting to mislead collectors into believing that they are going to pay. The earlier the company is aware of a problem account, the more recourse options they may have. Thus, the speech analytics of the present disclosure can function as an early warning system to reduce losses.

Also included in this disclosure are embodiments of integrated workforce optimization platforms, as discussed in U.S. patent application Ser. No. 11/359,356, filed on Feb. 22, 2006, entitled "Systems and Methods for Workforce Optimization," and U.S. patent application Ser. No. 11/540,185, filed on Sep. 29, 2006, entitled "Systems and Methods for facilitating Contact Center Coaching," both of which are hereby incorporated by reference in their entireties. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (Kips) and scorecards that analyze and help identify synergies, opportunities and improvement areas; (4) e-Learning—training, new information and protocol disseminated to staff, leveraging best practice customer interactions and delivering learning to support development; (5) Analytics—deliver insights from customer interactions to drive business performance; and/or (6) Coaching—feedback to promote efficient performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Figure 3:
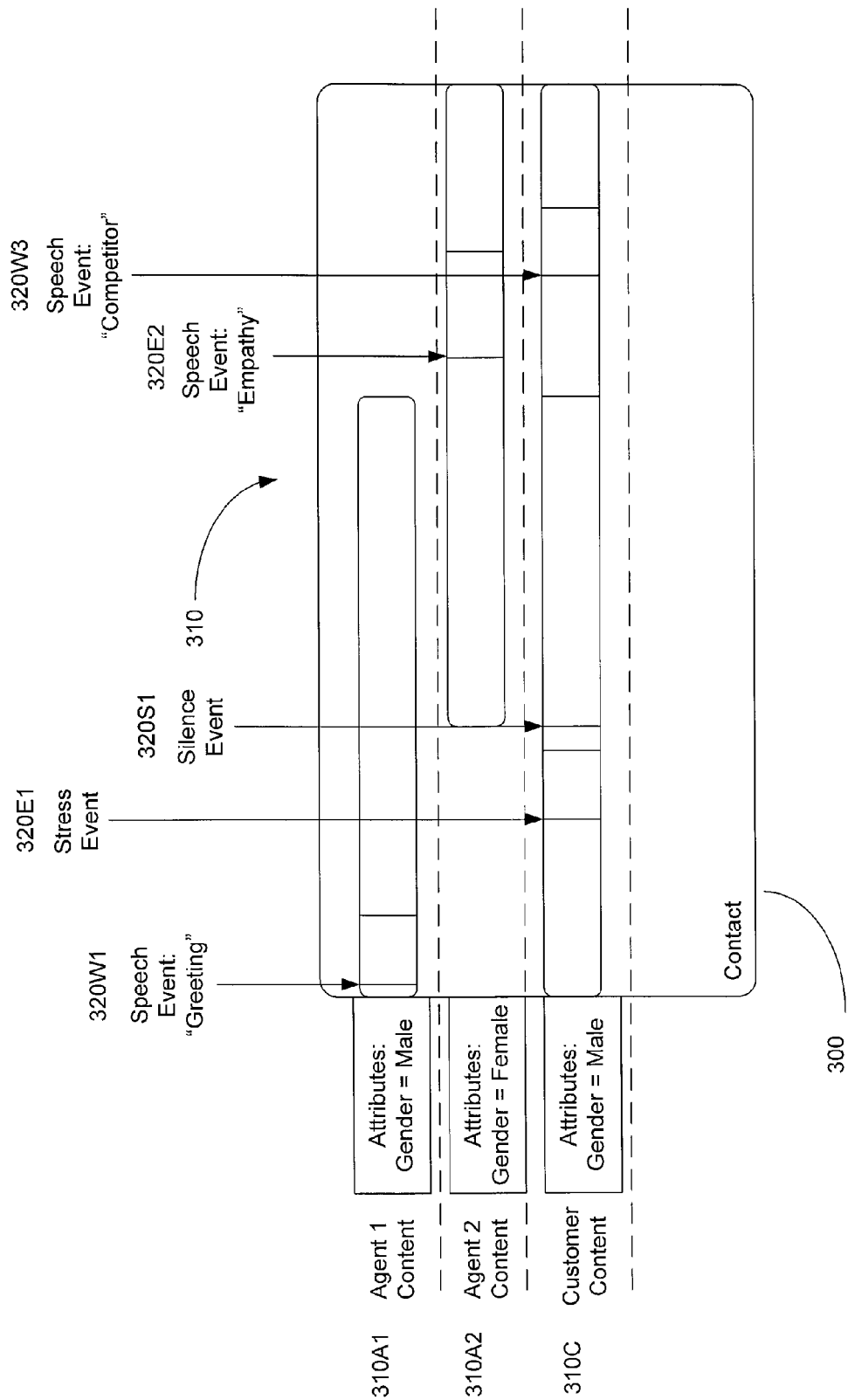
FIG. 3 shows a process performed by the mining function of FIG. 2.

Contacts analysis component 220 will now be discussed in further detail in connection with FIGS. 3 and 4. FIG. 3 shows a process performed by mining function 280. In this example, a recorded interaction 300 includes three streams of unstructured data 310, each containing audio content from one speaker: Agent1 (320A1), Agent2 (320A2), and Customer (320C). Other embodiments can include different numbers of unstructured data streams. Mining function 280 identifies structured data contained within the unstructured audio stream 310. Two types of structured data that can be mined from an unstructured audio stream are speaker attributes and speech events.

Attributes are identified characteristics associated with a segment of the unstructured stream 310. Some attributes describe the contact, such as inbound or outbound. Other attributes relate to speech, for example, language, speaker gender, speaker identifier (e.g., by agent role/customer role, or voice recognition to identify particular agents). In the example interaction of FIG. 3, mining function 280 has identified certain segments of the audio stream 310 as being male and female.

In addition to identifying stream attributes, mining function 280 also identifies events within an unstructured stream. Events are associated with a start time and a duration (or a start time and a stop time). Some events are linguistic in nature, while others are not. Examples of linguistic speech events include words/phrases (e.g., "supervisor", "Bank of America") and proximate words/phrases (e.g., "transfer me" and "supervisor" found within 5 seconds of each other). Examples of non-linguistic speech events include emotion/stress, and silence.

In the example interaction of FIG. 3, mining function 280 has identified five different speech events: a word event "greeting" (330W1) at time t1; a stress event (330E1) at t2; a silence event (330S1) at t3; an emotional event "empathy" (330E2) at t4; and a word event "competitor" (330W2) at t5.

Although mining an unstructured interaction to produce structured events and/or attributes is useful, at this level these events and attributes do not represent information in the context in which it was actually utilized. Thus, this level does not yet capture information that has semantic meaning to the business, i.e., business intelligence. In FIG. 4 pattern recognition function 290 performs a process in which correlations between multiple events and/or attributes are identified. The identified correlations, or patterns, have a higher value of semantic meaning for the business enterprise as compared to individual events and attributes.

Figure 4:
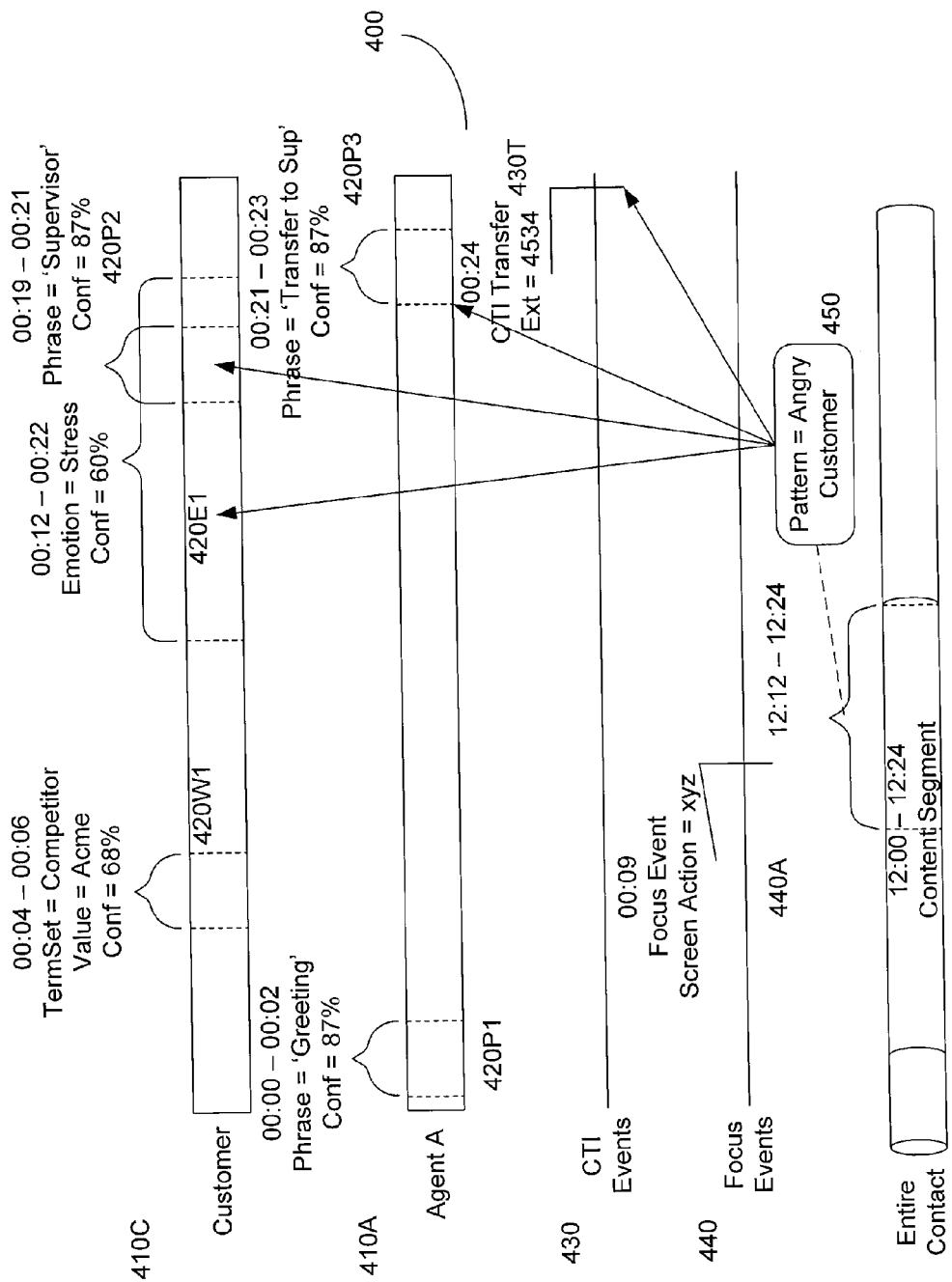
FIG. 4 shows a process performed by the pattern recognition function of FIG. 2.

FIG. 4 shows patterns identified in a recorded contact 400. The unstructured audio stream has already been mined to identify two speakers, a customer and an agent. The recorded contact in FIG. 4 is therefore shown as containing two logical streams, one for the customer (410C) and the other for the agent (410A). The mining function 280 has also identified several speech events: phrase event "greeting" (420P1); word event "competitor" (420W1); emotion event "stress" (420E1); phrase event "supervisor" (420P2); and phrase event "transfer to supervisor" (420P3).

Two additional streams of structured data are also included in interaction 400. One structured data stream (430) includes events from contact router 140 (see FIG. 1), such as a Call-Transfer 430T. The other structured data stream (440) includes events from agent workstations 120. In this example, a workstation event such as event 440A specifies a particular application running on the agent workstation, as well as a particular screen within the application. In other implementations, the events may also include application inputs (e.g., keystrokes, mouse clicks).

Pattern recognition function 290 analyzes the structured data within multiple captured streams to identify one or more patterns. In the example interaction of FIG. 4, pattern recognition function 290 has identified an Angry Customer pattern (450) from the sequence of structured data. The Angry Customer pattern starts with stress event 420E1, followed by the phrase event "transfer to supervisor" 420P2 as spoken by the agent, followed by a contact router Transfer event 430T. These patterns are defined by business rules which may be based on generic templates and then customized for the specific business enterprise.

Speech analytics is typically deployed as a mechanism to extract business intelligence out of the conversations captured in the contact center. For example most common applications include: contact classification (billing, technical support, etc.); contact disposition (resolution of issue); topic trending (mentions of competitor, product, etc.); business process improvement (identification of repetitive activities for automation, etc.); issue identification (to reduce churn); and automated contact scoring.

Figure 5:
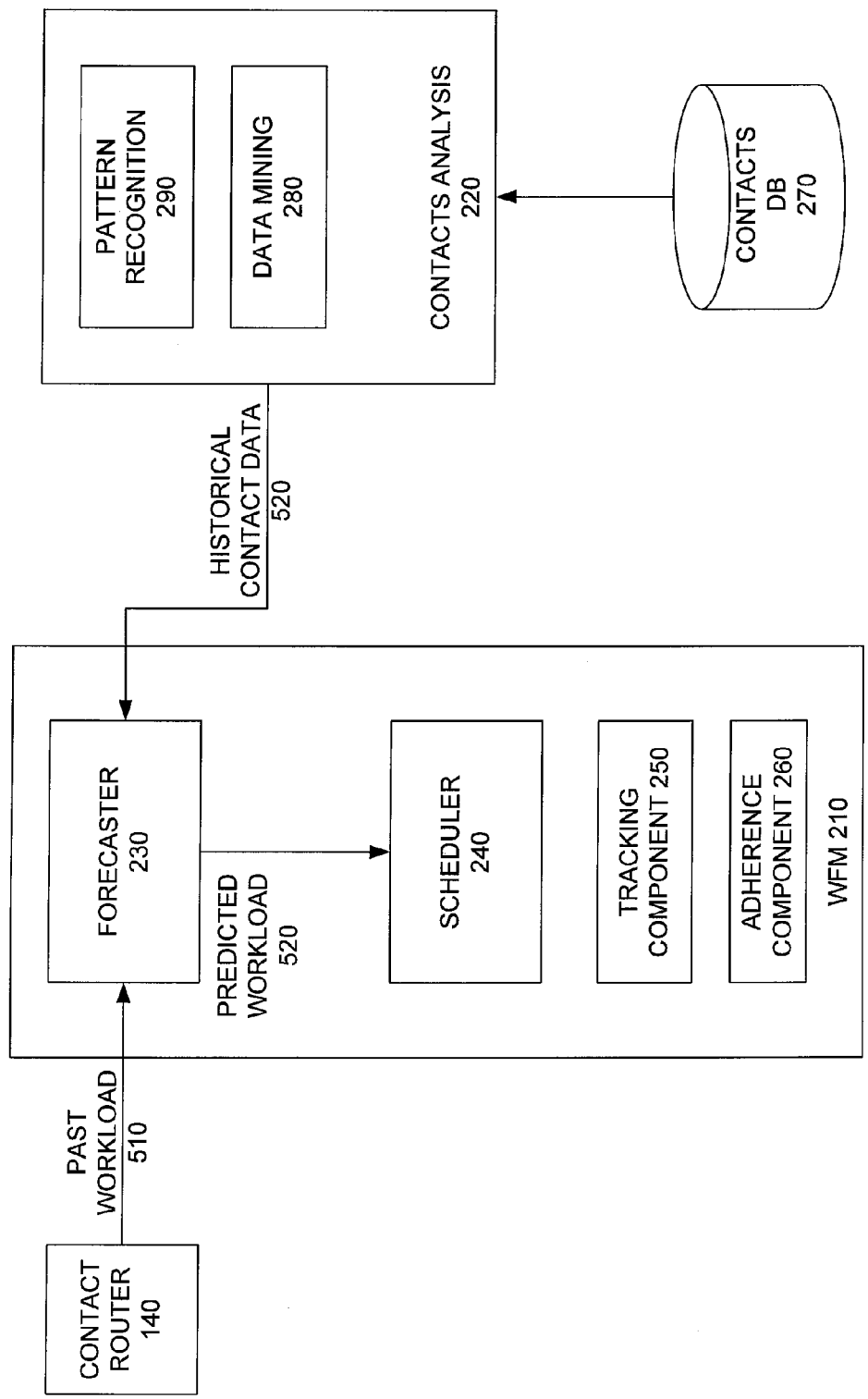
FIG. 5 is a data flow diagram showing component interactions in one embodiment of a method or system of integrating the forecaster and contacts analysis components of FIG. 2.

FIG. 5 is a data flow diagram showing component interactions in one embodiment of a method or system of integrating forecaster 230 and contacts analysis component 220. Forecaster 230 receives historical workload data (510) from contact router 140. Workload data 510 describes past contacts coming into, and going out of, the contact center, for example, contact volume, handle time, time to answer, etc. Workload data is typically tracked per queue, in correlation with time periods. This workload data 510 provided by contact router 140 is not based on the content of the contact.

In contrast, forecaster 230 also receives historical contact data (520), from contacts analysis component 220, which includes information derived from the content of the contact. In one embodiment, contacts analysis component 220 derives this information by performing various classifications, for example, classifying contacts according to topic, disposition (e.g, resolved, open, etc.), and emotional content (e.g., "stressed", "angry"). In one embodiment, classification applies speech analysis techniques to voice calls to extract keywords which suggest call topic and/or disposition, to identify emotional content, etc. In another embodiment, classification applies text analysis to email, instant messages, text chat, etc. to extract keywords which suggest call topic, disposition, and/or emotional content.

Like workload data 510, contact content data 520 also includes correlation with time periods. In some embodiments, these time periods include intraday, daily, weekly, and monthly.

Forecaster 230 examines historical workload data 510 and contact content data 520 to identify regularly occurring patterns and trends in the contact center workload, and produces a prediction of future workload 530. Patterns describe repeating occurrences of similar content at related time periods. One example of a contact content pattern is a number of contacts that were classified into the same topic category (similar content), and that occur during the early evening shift (related time periods).

Using only historical workload data 510 from contact router 140, forecaster 230 is limited to identifying patterns such as "more call volume on Monday mornings," "longer handle time after lunch," etc. However, the reason why there are more calls on Monday, or handle times are longer after lunch, is not clear from this data, since it doesn't include any information about the content of the contact.

The addition of contact content data 520 allows forecaster 230 to identify additional and more detailed patterns such as "more billing contacts during last week of month" and "more disposition=Issue Resolved at start of shift." Forecaster 230 can then take these patterns into account when producing the workload forecast 530, so that more agents are assigned to billing during the last week of the month. Thus, the workload forecast 530 produced by this integrated system of FIG. 5 is more accurate than a workload forecast produced by a conventional WFM system.

Figure 6:
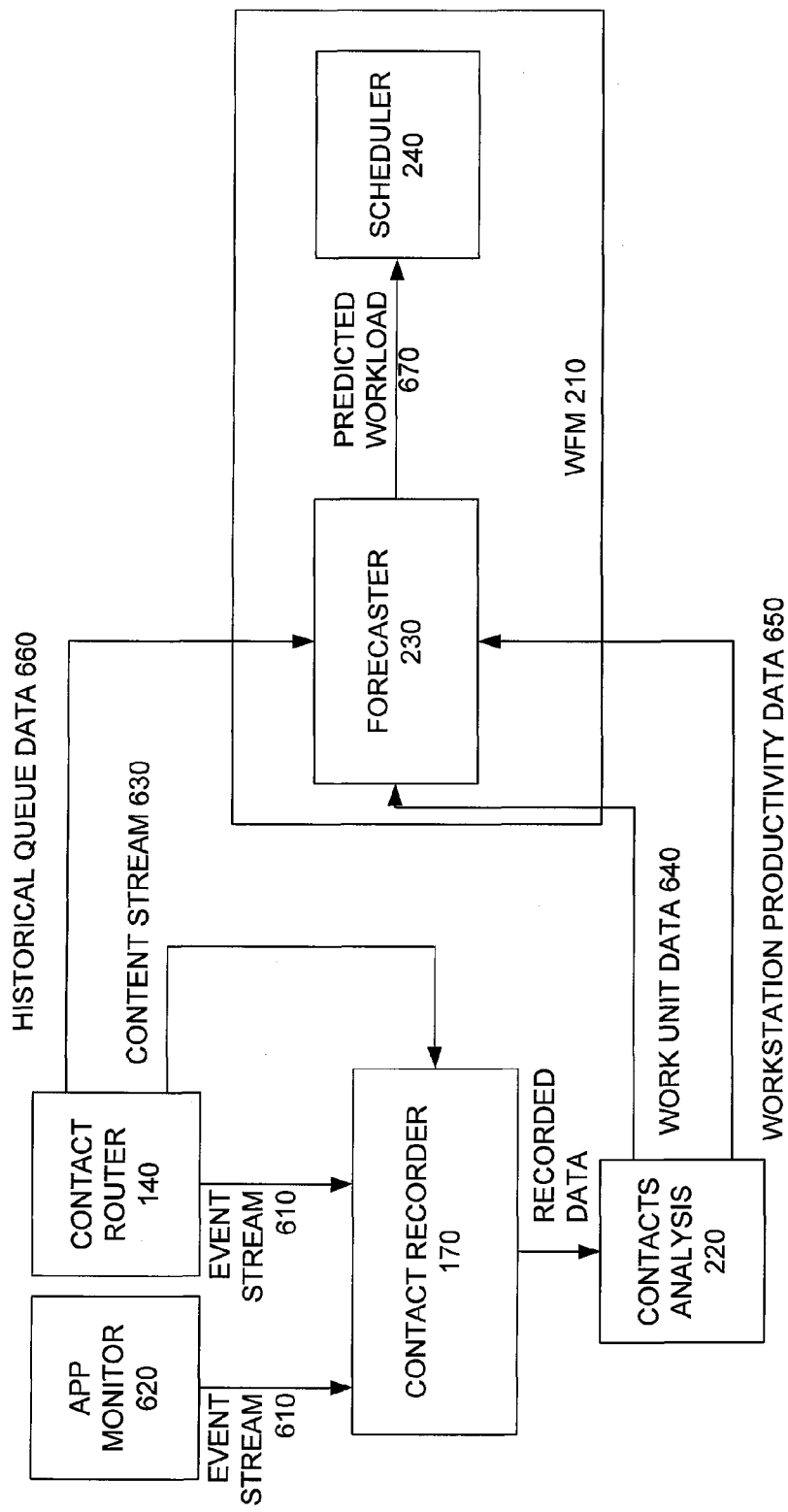
FIG. 6 is a data flow diagram showing component interactions in yet another embodiment of a method of system of integrating the forecaster and contacts analysis components of FIG. 2.

FIG. 6 is a data flow diagram showing component interactions in yet another embodiment of a method of system of integrating between forecaster 230 and contacts analysis component 220. As contacts are distributed to agents for handling, events 610 are collected from various sources, such as contact router 140 and an application monitor 620. For example, as the agent takes calls throughout a workday, the contact router 140 reports changes in the state of the agent's phone as ACD events, and as an agent interacts with various applications on his workstation 120, application monitor 620 tracks and reports application events. In one implementation, the granularity of application events is application-level, so that events describe when applications start and exit, and when a user switches from one application to another. In another implementation, the granularity of application events is screen-level, so that events describe a particular screen displayed within an application. In yet another implementation, application events are low-level, including input and/or output associated with each application (e.g., keystrokes, mouse clicks, and screen updates).

Contact recorder 170 records these event streams, as well as the contact content stream 630 (e.g., the voice stream for a voice call, or a data stream for computer contact such as email, chat, etc.). As described above, contacts analysis component 220 performs various analyses on the recorded streams to produce structured data and to identify patterns.

In the embodiment of FIG. 6, contacts analysis component 220 also analyzes recorded workstation events and determines how many agent work units these events represent. A work units is determined by mapping sequences of events to business transactions which are considered agent work units 640. For example, a particular sequence of screens within a customer relationship manager (CRM) application may indicate a "new customer record creation," and another sequence might indicate a "new order creation," where a "creating a new customer" and "creating a new order" are defined as agent work units. (More details of mapping events to business transactions can be found in U.S. patent application Ser. No. 11/359,319 "System and Method for Detecting and Displaying Business Transactions.")

Determining agent work units 640 for non-phone contacts allows contacts analysis component 220 to produce a measure which is analogous to a handle time for a phone contact. This type of measure for non-phone activities is not readily available in conventional call center software.

Contacts analysis component 220 also produces, from agent workstation events, workstation productivity data 650 indicating the amount of time an agent spends in productive computer activities, in non-productive computer activities, or both. In one embodiment, productive/non-productive is determined at the level of a particular workstation applications (e.g., CRM and corporate email application are productive, while games and web browser are not). In another embodiment, productive/non-productive is determined at a finer level of granularity. For example, certain screens within an application may be considered productive while others are not, or certain web pages or Internet addresses may be considered productive while others are not.

These two measures (640, 650) are provided to forecaster 230, which uses this data as a basis for determining historical workload for non-phone activities. Forecaster 230 analyzes this historical workload for non-phone activities, as well as historical phone workload data 660 from contact router 140, and identifies workload patterns and trends. From this information, forecaster 230 produces a prediction of future workload 670, which is used by the scheduler 240 to produce a schedule.

Figure 7:
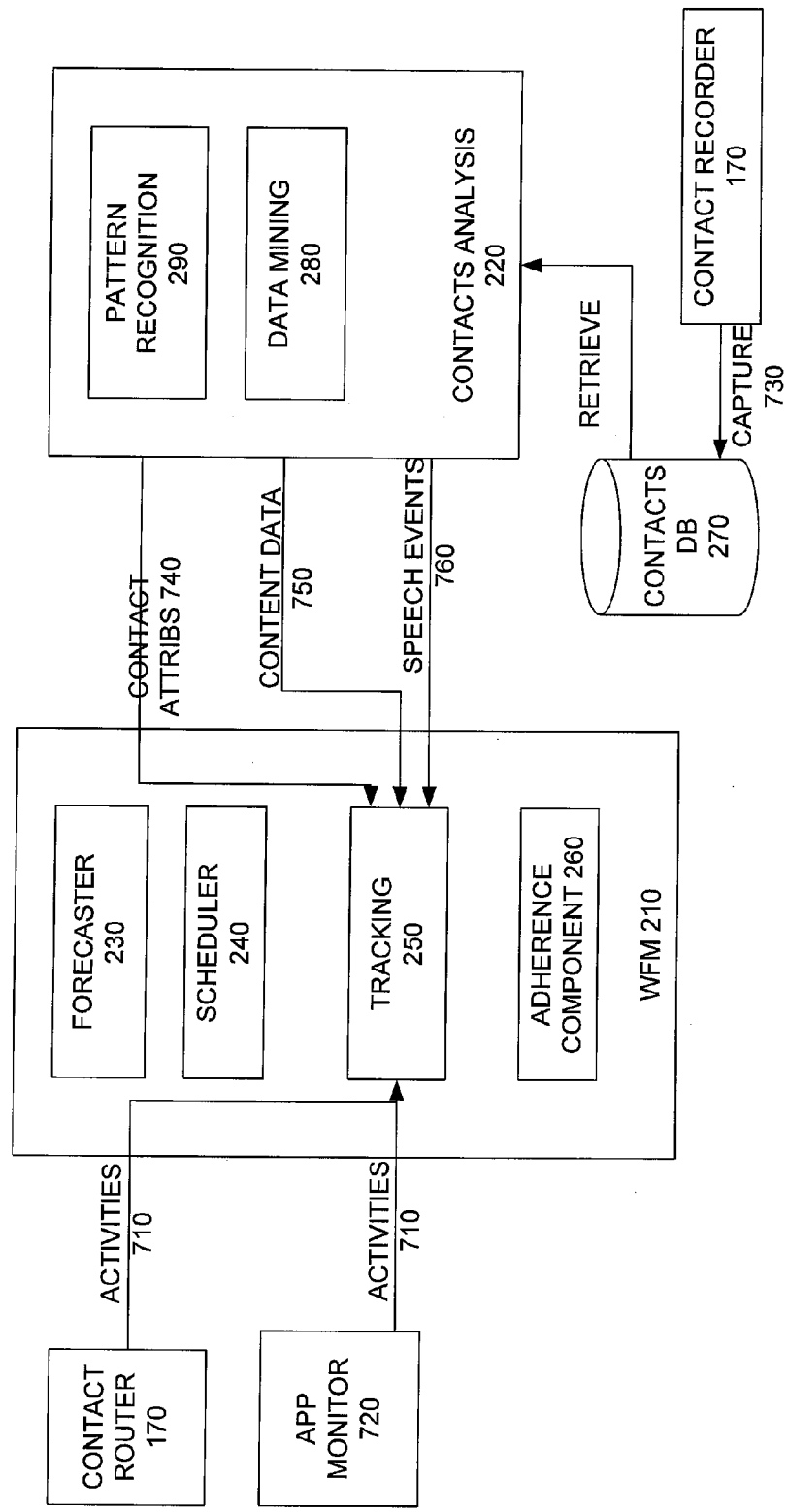
FIG. 7 is an object diagram showing component interactions in one embodiment of a method or system of integrating the forecaster and contacts analysis components of FIG. 2.

FIG. 7 is an object diagram showing component interactions in one embodiment of a method or system of integrating work force management and contact analysis. A tracking component 250 of WFM 210 receives reports of agent activities (710) throughout the workday. The activity 710 information typically includes an agent identifier, an activity source, an activity code, a start time, and a duration. Typical activity codes are Activity_Avail, Activity_Talk, Activity_AfterCallWork, Activity_Break, and Activity_Email. Examples of activity reporting sources are contact router 140 and a workstation application activity monitor 720. In one embodiment, the reporting components report device-specific events, and WFM 210 maps the events to agent activities. In the simplified view of FIG. 7, the reporting components are shown as reporting agent activities rather than events.

Contact recorder 170 captures (730) a portion, or all of, agent-customer contacts for storage in contacts database 270. Contacts analysis component 220 analyzes the contacts to derive information describing the contact. Some embodiments analyze the contacts to determine contact attributes (740) such as call time and duration, a queue identifier, and call transfer events (e.g., call was initially answered by a customer service agent but was then transferred to a specialist agent). Some embodiments of contacts analysis component 220 further analyze the contact to extract content information (750) such as contact topic and contact disposition. Some embodiments of contacts analysis component 220 also analyze the contact to determine the occurrence of specific speech events 760 (e.g., keywords)

Figure 8:
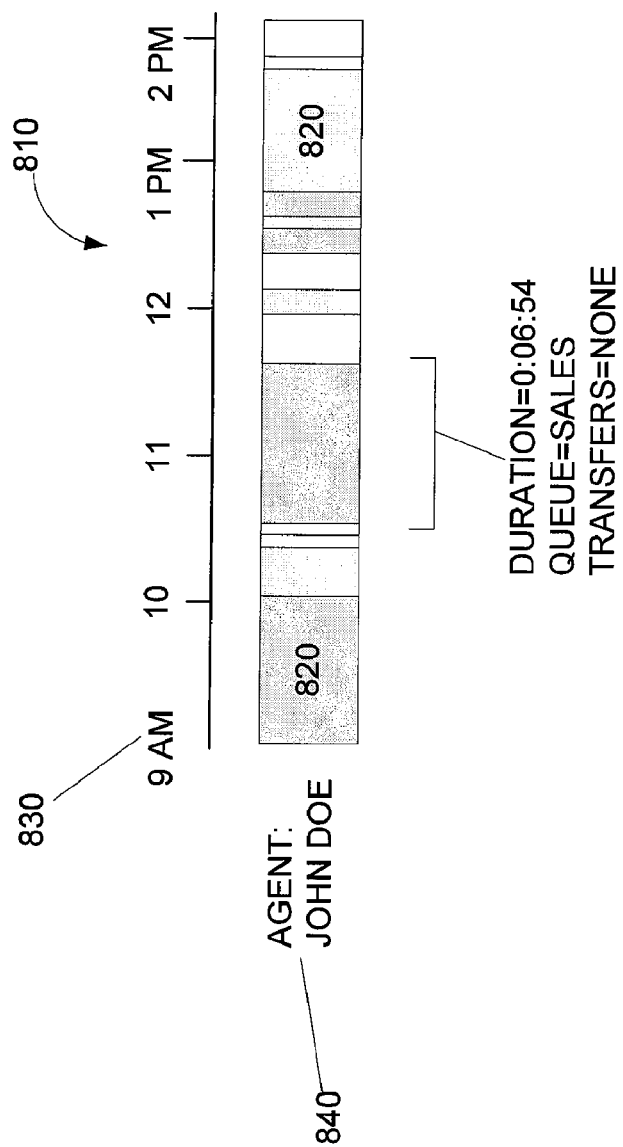
FIG. 8 is a screen shot of an activity view displayed by one embodiment of the tracking component of FIG. 2.

In the embodiment of FIG. 7, information provided by contacts analysis component 220 is used by a user interface of tracking component 250 to supplement activity information displayed to a contact center manager or supervisor. FIG. 8 is a screen shot of an activity view (810) displayed by one embodiment of tracking component 250. Tracking component 250 displays activities of one or more agents in a timeline view. Blocks (820) displayed in correlation with a timeline axis (830) represent activities, with blocks of different colors/shades/fills/etc. representing different types of activities. Activities for each agent are displayed on a different line.

When an agent activity is also associated with a recorded contact, tracking component 250 displays contact analysis information in conjunction with the activity. For example, contact attributes 740 can be displayed in visual proximity with the recorded interaction, as shown in FIG. 8. In one embodiment, contact attributes 740 are not displayed by default, but a user activates display of the attributes, for example, by clicking an icon or button. As another example, activity blocks of different colors can represent different contact topics. As yet another example, the occurrence of keywords within an activity can be represented by various small icons placed within the activity block.

Figure 9:
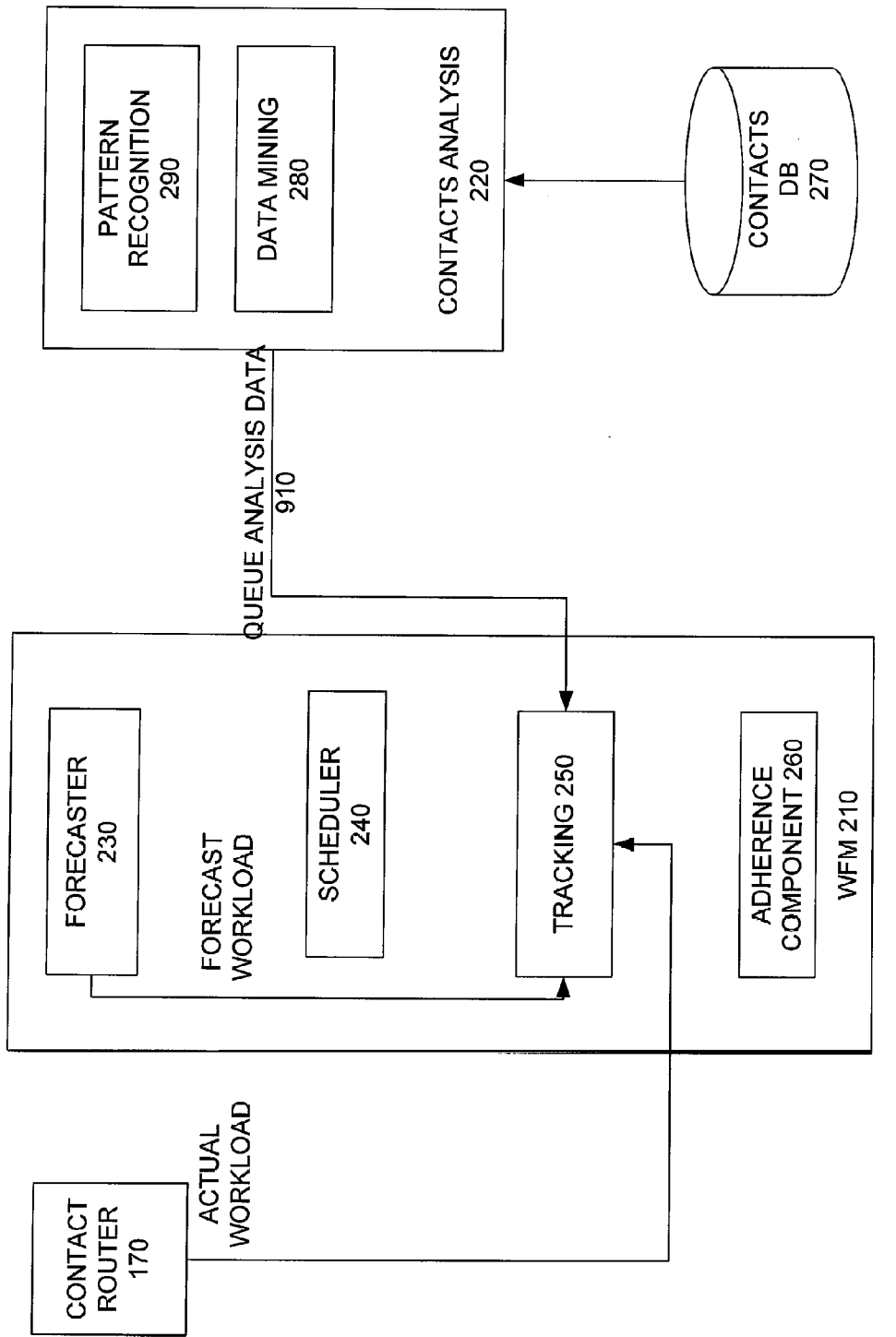
FIG. 9 shows another integration point between the tracking component and contacts analysis components of FIG. 2.

FIG. 9 shows another integration point between tracking component 250 and contacts analysis component 220. Tracking component 250 provides a user a graphical view of actual workload as compared to forecast workload, on a per queue basis. Contact center supervisors closely monitor this view so they can respond to changes in call volume or handle time. When a change in contact volume or handle time is detected, a supervisor typically investigates the root cause. For example, increases in call volume may be related to weather, product defects, promotions, policy changes, competitors activities, etc. Increases in call handle time may have similar causes or may be caused by slow systems.

In integrated contact center system 200, a user can quickly "drill down" from a particular queue statistic to one or more recorded contact interactions associated with the queue, and to any analysis data produced by contacts analysis component 220 that is associated with those contacts. When a user requests more detailed information on a queue statistic, tracking component 250 retrieves (910) related analysis data, and displays this additional detail to the user. For example, a queue with an increased average handle time may be associated with interactions that include unusual keywords, and this information is then provided to the user who "drills down" from the average handle time. In this manner, the user better understands the root cause of a deviation between actual workload and forecast, and can therefore make better decisions on how to respond.

Figure 10:
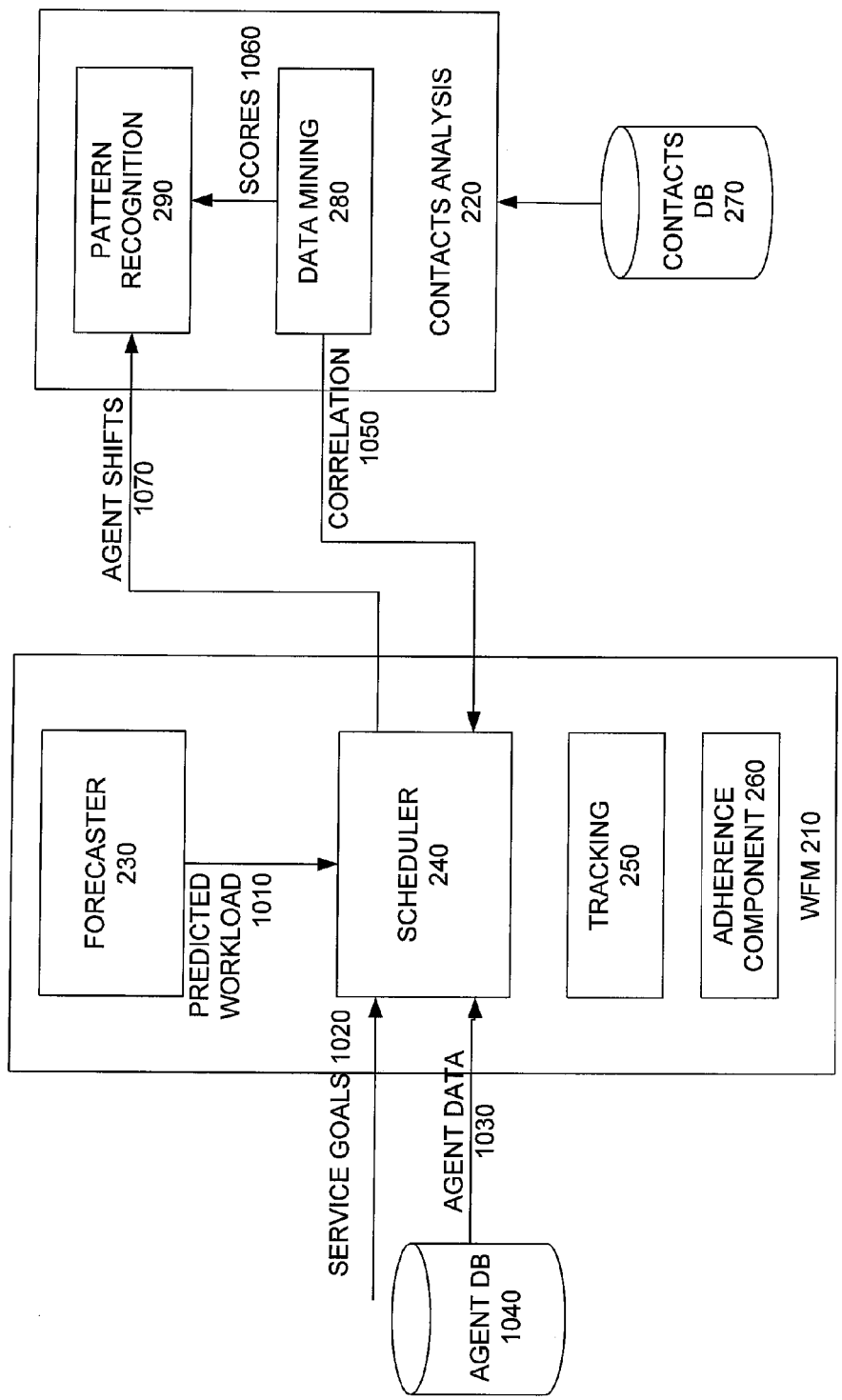
FIG. 10 shows an integration point between the scheduler and contacts analysis components of FIG. 2.

FIG. 10 shows yet another integration point between WFM 210 and contacts analysis component 220, this one involving scheduler 240. Scheduler 240 produces agent schedules using predicted workload 1010, service goals 1020, and agent information 1030. Agent information is typically provided from an agent database 1040, and includes information about skills, quality scores, and previously scheduled work activities. In integrated system 200, contacts analysis component 220 provides additional information used by scheduler 240, such as a correlation or relationship 1050 between agent interaction scores 1060 and agent shifts/work patterns 1070.

Typically, contact center personnel such as supervisors and quality analysts play back some of the interactions and review, evaluate, and score agent quality in various categories (product knowledge, selling, listening, etc.) However, only a relatively small portion of recorded interactions can be scored using this manual method, since it is time consuming. Thus, a percentage of calls are usually randomly selected for manual scoring.

In one embodiment, contacts analysis component 220 performs automatic call scoring on a larger portion, or even all, of the recorded interactions. For automatic scoring, interaction scores 1060 may be relative to each other rather than absolute as compared to a standard. Manual scoring may then be performed on a portion of the automatically scored interactions. For example, if contacts analysis component 220 classifies interactions into buckets having a 1 to 5 scale, then an "intelligent selection" feature may select X % of each bucket for manual scoring.

After scores 1060 are produced (manually, automatically, or in combination), a correlation engine within contacts analysis component 220 looks for correlations between scores 1060 and agent shifts and agent work patterns. Such correlations, when found, suggest that interaction quality increases or decreases with certain shift or work patterns. For example, the interaction quality of most agents may decline after handling particular contact types for more than a specific length of time, or that a certain mix of contact types leads to a decline in interaction quality (possibly because the context switch from one contact to the next is difficult for the agent).

The correlation data 1050 is provided to scheduler 240, which can use the data to generate schedules that lead to higher quality interactions. Identified correlations can be tracked within the database repository as dynamic data relationships. Since these are non-structured and very dynamic, this relationship may be represented via a dynamic association that could be programmatically configured rather than being represented as data structures per se.

One embodiment of the correlation engine will now be described in more detail. This embodiment utilizes an agent schedule database, a quality performance database, and a contact center operation database when determining correlations between scores 1060 and shifts and work patterns. The agent schedule database may include data such as skills, day, date, breaks, meetings, and training. The quality performance database may include data such as contact quality scores and agent names. The contact center operation database may include data such as contact identification, contact type, agent name, contact stats (e.g., time/date percentage of contacts answered, average handling times, contact volumes, wait times, abandonment rates), and timing details (e.g., events occurring within a certain time period of each other).

The correlation engine identifies patterns (or correlation-based discovery) that show why and/or when certain poor performance occurs repeatedly and correlated with exogenous events such as high AHT or long queue times. The correlation engine can provide n-way correlations between poor/good quality of agent measurements and other contact center details. Thus, the correlation engine can provide a statistical examination of time-indexed data to find correlations between quality of agents measured historically and other contact center details.

The correlation engine identifies statistically valid correlations between agent quality scores and other contact data. The input data can be pre-processed or filtered to remove outlier data (for example, removal of all data that is a greater than two standard deviation away from the mean/median). In an alternative embodiment, the pre-processing can allow selective user-induced filtering on other parameters (for example, look only at data relating to a particular agent).

The filtered data, representing two axes of information is provided as input to a Pearson r linear correlation formula, which computes the value of r, known as the correlation coefficient. The correlation coefficient ranges from −1 (perfect negative correlation) to 0 (no correlation) to 1 (perfect positive correlation). In addition, statistical significance p (e.g., p<0.050) is computed based on total amount of data used to compute r and based on the probability of the value of r, which is based on random data. This significance value p, the total data set size N, and the correlation coefficient r constitute the outputs of the correlation engine, as shown in block 197. In block 198, a user can adjust the thresholds on desired levels of r magnitude, significance value p, data set size minima N, and other filters such as filtering to a single agent or a set of agents for data to be used in the correlation analyses. In addition, a user can also turn the pre-process filter on or off and input other combinations of paired values.

Clustering is another computational method used to determine correlation. Clustering takes all evaluated and unevaluated contacts and partitions them into sets, based on one or more parameters that are statistically correlated with quality of service. A contact center manager can visualize each "cluster" for the user and preferably annotate which contacts are evaluated and which are unevaluated. Yet another correlation computational method is statistical trend analysis, which looks for temporal trends in correlated sets of contacts to show that quality of service is increasing or decreasing statistically significantly over time.

The following is claimed:

1. A computer-implemented method of integrating workforce management and contacts analysis, comprising:
   in a computer-implemented contact analysis system:
      receiving contact content data for a plurality of recorded agent contacts, the contact content data correlated with past time periods;
      analyzing the contact content data to produce a classification for each of the plurality of recorded agent contacts based on emotional content of the plurality of recorded agent contacts;
      identifying at least one pattern in the classifications for each of the plurality of recorded agent contacts, the pattern determined from rules based on the contact classifications;
   in a computer-implemented workforce management system:
      receiving the at least one identified pattern from the contact analysis system;
      receiving historical workload data from a contact router; and
      generating a workload forecast based on the historical workload data and the at least one identified pattern.

2. The method of claim 1, further comprising:
   in the workforce management system, generating a schedule for a plurality of agents based on the workload forecast.

3. The method of claim 1, further comprising:
   in the contact analysis system, further classifying each of a plurality of recorded agent contacts into one of a plurality of categories according to at least one of call disposition or call topic.

4. The method of claim 1, wherein the recorded contact is text-based, and further comprising:
   in the contact analysis system:
      performing text analysis on the contact to identify at least one keyword; and
      classifying the contact into one of a plurality of categories based on the identified keyword.

5. The method of claim 1, wherein the recorded contact is a voice call, and further comprising:
   in the contact analysis system:
      performing speech analysis on the contact to identify at least one keyword; and
      classifying the contact into one of a plurality of categories based on the identified keyword.

6. A computer-implemented method of integrating workforce management and contacts analysis, comprising the steps of:
   in a computer-implemented contact analysis system:
      receiving contact content data for a plurality of recorded agent contacts, the contact content data correlated with past time periods;
      analyzing the contact content data to produce a classification for each of the plurality of recorded agent contacts based on emotional content of the plurality of recorded agent contacts;
      identifying at least one pattern in the classifications for each of the plurality of recorded agent contacts, the pattern determined from rules based on the contact classifications;
      monitoring a stream of application events from an application monitor, each event associated with agent workstation activity;
      determining a count of agent work units represented by the application event stream;
   in a computer-implemented workforce management system:
      receiving the at least one identified pattern from the contact analysis system;
      receiving historical workload data from a contact router; and
      generating a workload forecast based on the historical workload data, the at least one identified pattern, and the count of agent work units.

7. The method of claim 6, further comprising:
   in the contact analysis system, producing workstation productivity data from the application events.

8. The method of claim 7, further comprising:
   in the workforce management system, generating the workload forecast based on the historical workload data, the count of agent work units, and the workstation productivity data.

9. The method of claim 7, further comprising:
   in the workforce management system:
      determining historical workload for non-phone activities from the agent work units and the workstation productivity data; and
      identifying workload patterns by analyzing the historical workload for non-phone activities and historical workload for phone activities.

10. The method of claim 6, wherein the determining step further comprises:
   determining the count of agent work units represented by the application event stream by mapping a sequence of events within the stream to agent work units.

11. The method of claim 6, wherein the application events comprise application-level events.

12. The method of claim 6, wherein the application events comprise screen-level events.

13. The method of claim 6, wherein the application events comprise application input/output events.

14. A method of viewing data associated with recorded agent interactions from a window that displaying agent activity information, the method comprising the steps of:
   in a computer-implemented contact analysis system:
      capturing a plurality of contacts made by an agent;
      receiving contact content data for the plurality of captured agent contacts, the contact content data correlated with past time periods;
      analyzing the contact content data to produce a classification for each of the plurality of captured agent contacts based on emotional content of the plurality of captured agent contacts;
      identifying at least one pattern in the classifications for each of the plurality of recorded agent contacts, the pattern determined from rules based on the contact classifications;
   in a computer-implemented workforce management system:
      receiving the at least one identified pattern from the contact analysis system;
      receiving historical workload data from a contact router;
      generating a workload forecast based on the historical workload data and the at least one identified pattern;
      displaying a timeline;
      displaying, in visual correlation with the timeline, a plurality of activities performed by the agent, at least a portion of the activities associated with one of the captured contacts; and
      displaying, for those activities associated with one of the captured contacts, a contact attribute, in visual proximity to the activity.

15. The method of claim 14, wherein the analyzing step further comprises:
   analyzing at least a portion of the contacts to identify a contact attribute, wherein the contact attribute comprises at least one of call time, call duration, and queue identifier.

16. The method of claim 14, wherein the analyzing step further comprises:
   analyzing at least a portion of the contacts to extract content information, wherein the content information comprises at least one of topic and disposition.

17. The method of claim 14, wherein the analyzing step further comprises:
   analyzing at least a portion of the contacts to determine an occurrence of a speech event, wherein the speech event comprises a predefined keyword.

18. The method of claim 14, further comprising:
   in the workforce management system:
      displaying a plurality of queue statistics, each queue statistic associated with a queue in a plurality of queues; and
      receiving a selection of one of the queue statistics; and
      displaying contact analysis data for a contact in a plurality of recorded contacts, the recorded contacts associated with the queue that is associated with the selected queue statistic, responsive to receiving the selection.

* * * * *